United States Patent [19]

Salice

[11] Patent Number: 4,826,345
[45] Date of Patent: May 2, 1989

[54] CONNECTING FIXTURE

[75] Inventor: Luciano Salice, Carimate, Italy

[73] Assignee: Arturo Salice S.p.A., Novedrate, Italy

[21] Appl. No.: 135,989

[22] Filed: Dec. 21, 1987

[30] Foreign Application Priority Data

Dec. 22, 1986 [DE] Fed. Rep. of Germany ....... 3644062

[51] Int. Cl.$^4$ .................. F16B 9/02; F16B 12/20
[52] U.S. Cl. .................. 403/231; 403/245; 403/330; 403/407.1
[58] Field of Search ............ 403/231, 245, 407.1, 403/406.1, 264, 321, 325, 327, 330, 246, 322

[56] References Cited

U.S. PATENT DOCUMENTS

| | | | |
|---|---|---|---|
| 3,456,969 | 7/1969 | Wittenmayer | 403/406.1 |
| 4,360,282 | 11/1982 | Koch | 403/322 X |
| 4,487,522 | 12/1984 | Appleby et al. | 403/231 |
| 4,502,807 | 3/1985 | Salice | 403/330 X |
| 4,553,873 | 11/1985 | Salice | 403/245 |
| 4,582,446 | 4/1986 | Salice | 403/407.1 |
| 4,752,150 | 6/1988 | Salice | 403/231 X |
| 4,756,637 | 7/1988 | Walz | 403/231 |

Primary Examiner—Andrew V. Kundrat
Assistant Examiner—Peter M. Cuomo
Attorney, Agent, or Firm—Fleit, Jacobson, Cohn & Price

[57] ABSTRACT

A connecting fixture serves to detachably connect two abutting platelike furniture parts, which preferably extend at right angles to each other. Two fixture elements are secured to respective furniture elements to be connected. The first fixture element has an undercut-defining portion, which may be in the form of a step, a backing edge, or a mushroom-shaped head. The second fixture element has a spring detent lever for releasably engaging the undercut portion and holding the elements together. The safety of the connecting fixture is increased in that it can selectively be locked by rigidly cooperating connecting means. For that purpose a spring which biases the detent lever is held under an initial stress between the detent lever and an abutment portion of the second fixture element. The abutment is movable between a position for engaging and locking the lever in its detent position and a position in which it releases the detent lever to be biased by the spring.

17 Claims, 3 Drawing Sheets

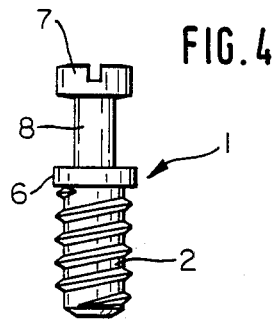
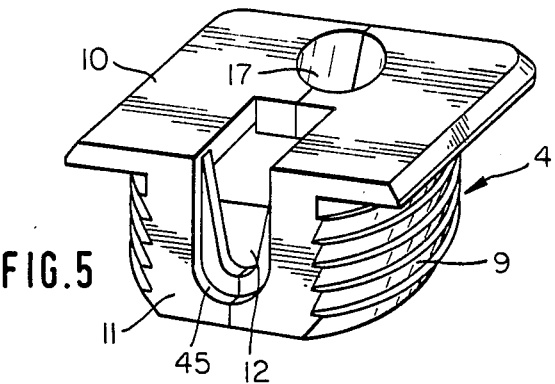
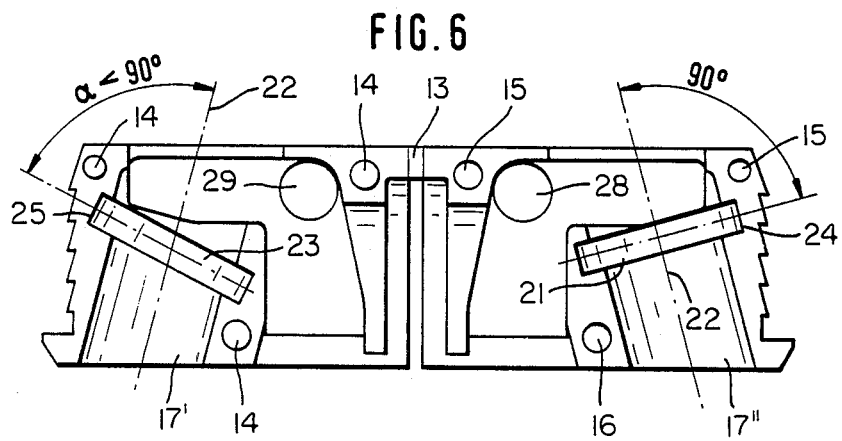
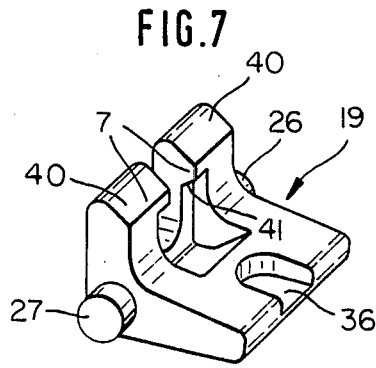
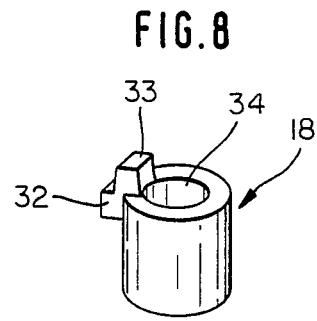

CONNECTING FIXTURE

BACKGROUND OF THE INVENTION

1. Field of the Invention

This invention relates to a connecting fixture for detachably connecting together two abutting platelike furniture parts, which preferably extend at right angles to each other. The fixture comprises two fixture elements, which are adapted to be secured to the respective furniture elements, wherein the first of said fixture elements has an undercut-defining portion consisting, for example, of a step, a backing edge, a mushroom-shaped head or the like, and the two fixture elements are adapted to be interlocked by means of a hook-shaped end portion of a pivoted and spring-biased detent lever carried by the second fixture element, and which extends or snaps into engagement with said undercut portion.

2. Description of the Prior Art

Such connecting fixtures which are preferably self-tightening are known, e.g., from European Patent Publication No. 58,220, now U.S. Pat. No. 4,752,150. In the known connecting fixtures the detent joint and any self-tightening action are provided by the spring-biased detent lever, which with a hooklike portion interengages with a detent projection or the like. Because the connecting fixtures of said kind are mass-produced the manufacturing tolerances often are not complied with sufficiently accurately to ensure a backlash-free joint and a self-tightening action, if desired. As a result, the connecting fixture may not operate satisfactorily. In the use of such known connecting fixtures, manufacturing tolerances may result in backlash which permits a wobbling of the furniture elements which are connected. Finally, the safety of the joint may be adversely affected so that the fixture elements may unintentionally separate from each other.

The safety of the known connecting fixtures and the backlash free joint provided by them will depend not only on the compliance with manufacturing tolerances but also on the exertion of the required locking force by the detent spring which biases the detent lever. Unless that locking force is sufficient, unintended separation may occur, particularly in case of an improper handling.

SUMMARY OF THE INVENTION

It is an object of the invention to provide a connecting fixture of the kind described and which has a higher degree of safety because it can selectively be locked by rigidly cooperating connecting means.

In accordance with the invention the spring which biases the detent lever is held under an initial stress between said detent lever and an abutment portion of the second fixture element, which is movable between a position for locking the lever in its detent position by engagement therewith and at least one position in which it disengages the detent lever which is then biased by the spring. The second fixture element is adapted to be held in each of said positions. In the connecting fixture in accordance with the invention an adjustment can be effected which permits the abutment portion to be moved to either of two positions. In one of said positions the abutment portion bears on and locks the detent lever so that the joint between the fixture elements cannot be disconnected unless the abutment portion is moved to a position in which such separation is permitted. In the other position the spring which biases the detent lever bears on the abutment portion, which in that position does not directly engage the detent lever. The force that is exerted by the spring on the detent lever can be changed by a proper adjustment of the abutment portion. Specifically, the abutment portion can be adjusted to reduce the force of the spring to such an extent that the detent joint between the fixture element can be eliminated by the application of a corresponding opposing pressure whereas special implements are not required for that purpose.

In a preferred embodiment, the abutment portion may consist of a cylindrical abutment pin, which is held in a cylindrical opening or bore of the housinglike second fixture element and which is provided with a radial projection extending into a recess in the surface that defines the bore so that the abutment pin can be held in different positions, which are spaced apart in the axial direction of the bore. The radial projection may consist of a cam, which extends into a guide groove that is formed in the surface defining the bore. The guide groove may extend around the entire periphery of the surface that defines the cylindrical opening or bore. The guide groove suitably consists of a non-rising peripheral portion and an adjoining rising peripheral portion. Within the scope of the invention the cam or another portion of the abutment pin may have an axial extension, which by a rotation of the abutment pin can be moved between first and second positions. In the first position the projection bears on the detent lever, positively to lock the latter in the locking position. In the second position the projection disengages the detent lever, so that the lever is held in its locking position only by the biasing spring.

In a suitable embodiment, the housing of the second fixture element may consist of two parts which define a parting line extending through the axial center plane of the second fixture element, the two housing parts define portions of the guide groove, one portion of the guide groove extends at right angles to the center line of the bore, another portion of the groove extends at an acute angle to said center line and the guide groove portions register with each other at the parting line. Such housings can desirably be made from plastic as injection moldings.

The cam is desirably disposed at the inner end of the abutment pin.

In a development of the invention the abutment pin has external screw threads and the bore has mating internal screw threads. By a rotation of the abutment pin, e.g., by means of a screwdriver, the prestressing force exerted by the spring on the detent lever can be changed or the detent lever can be entirely blocked in that the abutment pin is screwed down into engagement with the detent lever.

The hooklike head of the detent lever is suitably beveled in the direction in which the undercut-defining portion is slidably inserted so that the detent lever will snap to its locking position into the undercut as the fixture elements are pushed one into the other.

In a desirable embodiment the inner surface of the hooklike projection has a beveled or rounded detent surface, which may result in a self-tightening action, or may permit the detent joint to be eliminated by the application of opposing pressure, particularly when the stressing force exerted by the spring has been reduced by a corresponding displacement of the abutment pin.

The axis of the bore for the abutment pin may be inclined from the center line of the cuplike second fixture element so that a screwdriver for operating the abutment pin can be more easily applied.

BRIEF DESCRIPTION OF THE DRAWING

FIG. 4 is a side elevation showing the pinlike first fixture element.

FIG. 5 is a perspective view showing the second fixture element.

FIG. 6 is a top plan view showing the second fixture element, which consists of left and right plastic injection moldings and is shown before it is assembled about its vertical center plane.

FIG. 7 is a perspective view showing the detent lever.

FIG. 8 is a perspective view showing the abutment pin.

DESCRIPTION OF THE PREFERRED EMBODIMENTS

Illustrative embodiments of the invention will be described in more detail hereinafter.

Figure 1:
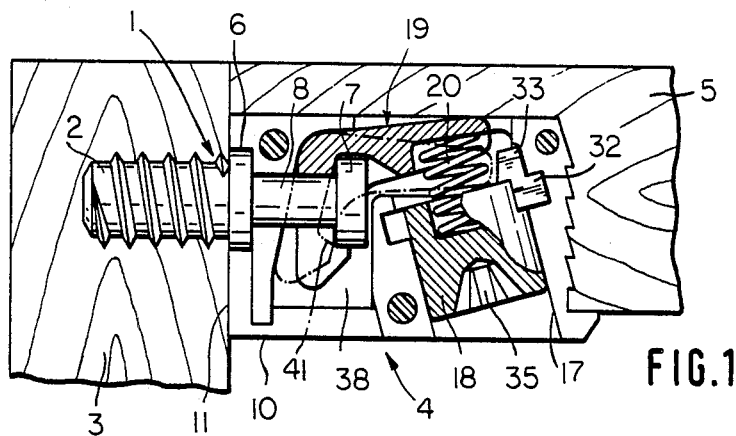
FIG. 1 is a longitudinal sectional view showing a first embodiment of a connecting fixture having fixture elements which are connected to furniture elements, and which are shown in their assembled condition.
Figure 2:
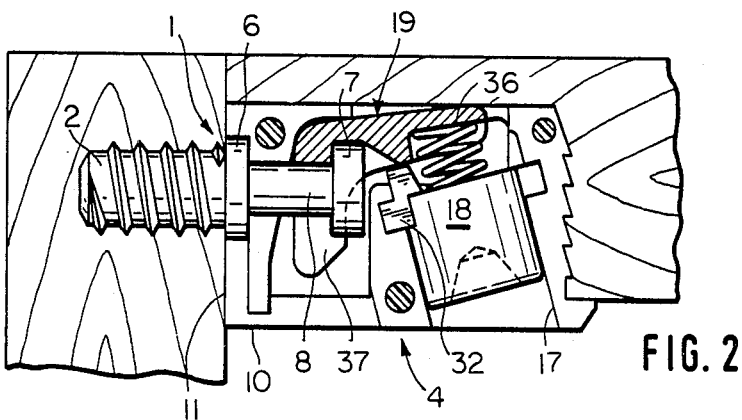
FIG. 2 is another longitudinal sectional view which shows the connecting fixture with the detent lever locked in its locking position.
Figure 3:
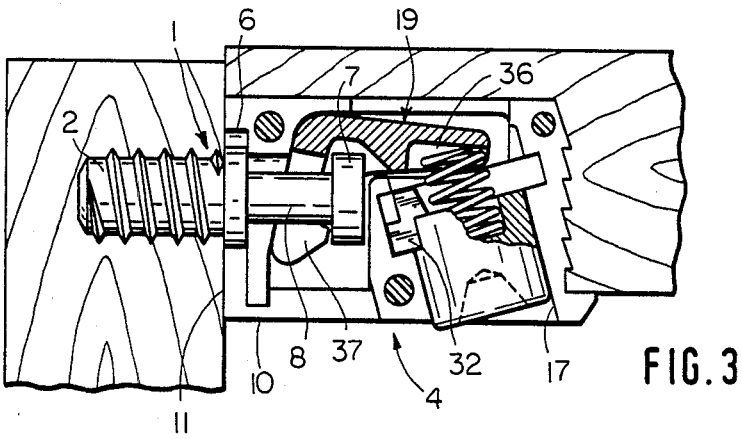
FIG. 3 is a longitudinal sectional view showing the connecting fixture of FIGS. 1 and 2 after the detent lever has been unlocked and the spring for biasing the detent lever has been relaxed so that the joint can be disconnected by the application of pressure in an upward direction.

The connecting fixture shown in FIGS. 1 to 8 consists of a pinlike first fixture element 1 and a cuplike second fixture element 4. The pinlike fixture element 1 has a lower shank portion 2, which is provided with screw threads and which in the illustrative embodiment shown in FIGS. 1 to 3 can be screwed, e.g., into a vertical wall 3 of a cabinet or cupboard. The cuplike second fixture element 4 can be secured, e.g., to a top plate 5 or to an intermediate deck in a milled bore thereof, as is also shown in FIGS. 1 to 3.

The screw threads of the first fixture element 1 can be screwed into a furniture element until the collar 6 of the shank engages the surface of the furniture element. Between the collar 6 and the head 7, which has a screwdriver slot, the fixture element 1 has a threadless shank portion 8. The second fixture element 4 (see FIG. 5) consists of a cuplike housing 9, which is provided with sawtoothlike cover plate 10. The second fixture element 4 comprises a flattened front face 11, which bears on the furniture element to which the fixture element 4 has been secured. That front surface 11 is formed with an open-topped slot 12, which extends into the flangelike cover plate 10, as shown.

The housinglike second fixture element 4 consists of a bipartite plastic injection molding as is shown in FIG. 6. In the injection molding, the parts are inter-connected by a thin strip 13 which is similar to a film hinge. The left-hand half of the cuplike fixture element 4 is provided with projecting pins 14, which can be forced into mating openings in the other half of the fixture element 4 in order to join the halves of the fixture element 4 to each other. Each half of the fixture element 4 has a semicylindrical troughlike recess 17' or 17", and in the assembled fixture element said recesses constitute a cylindrical bore 17, in which the abutment pin 18 is held which cooperates with the spring 20 which biases the detent lever 19.

The trough-shaped recess 17' is formed in its inner end portion with a semicircular groove 21, which extends at right angles to the center line 22 of the bore 17. The trough-shaped recess 17 is formed with a semicircular groove 23, which includes with the center line 22 an angle α which is smaller than 90°. When the cuplike fixture element 4 has been assembled, the ends 24, 25 of the semicircular grooves 21, 23 are superimposed to form a continuous guide groove.

The detent lever 19 shown in FIG. 7 is a bell-crank lever, which adjacent to the transition between its legs is provided with pivot pins 26, 27, which are aligned with each other and which are held in mating openings 28, 29 of the cuplike housing 9. The abutment pin 18 is held and located in the bore 17 and for that purpose is provided at its lower end with a radial cam 32, which in the assembled fixture extends into the guide grooves 21, 23. The radial cam 32 is also provided with an axial extension 33, which protrudes over the bottom end face of the abutment pin 18. The abutment pin is formed in its top end face with a recess 34, in which one end of a helical compression spring 20 is held. The bottom end face of the abutment pin 18 is provided with a star-shaped recess 35 for the application of a screwdriver.

The other end of the helical compression spring 20 is located in a recess 36 formed in the detent lever 19. That leg of the detent lever 19 which is provided with the hooklike projections 37 is disposed in the opening 38 of the second fixture element 4 in the manner shown in FIGS. 1 to 3. The opening 38 serves to receive the enlarged head 7 of the first fixture element 1. The outside surface of the hooklike projections 37 of that leg is provided with beveled wedge-shaped surfaces 40 so that the detent lever will be swung back by the enlarged head 7 of the first fixture element 1 as said head is inserted into opening 38 in an upward direction in FIGS. 1 to 3. The detent lever will thus be swung back until the beveled rear detent faces 41 of the hooklike projections snap behind the enlarged head 7, as is shown in FIG. 1.

In order to ensure a snug engagement between the front face 11 of the second fixture element 4 and the adjacent surface of the furniture element 3, the front face 11 is formed with a wider groove 45 for receiving the collar 6. The depth of the groove 45 equals the height of the collar. Shank 8 is received in groove 12.

The function of the connecting fixture will now be explained with reference to FIGS. 1 to 3. The connecting fixture will be delivered in the state which is shown in FIG. 1 and in which the cam 32 is disposed adjacent to the ends 24, 25 of the guide grooves 21, 23 on that side of the second fixture element 4 that is opposite to the receiving opening 12. That leg of the detent lever 19 which is biased by the compression spring 20 is sufficiently short that it terminates before the extension 33 when the latter has been turned to its rear position 24, 25. Alternatively, the rearwardly directed leg may be formed with a recess so that said leg will not be engaged by the extension 33 in its rear position. In that position, shown in FIG. 1, the rearwardly facing leg of the detent lever 19 is biased by the properly prestressed compression spring so that the joint between the furniture elements can be established in that the shank portion 8 and the enlarged head 7 of the first fixture element are slidably inserted into the receiving opening 12 until the hooklike end portion 37 snaps behind the enlarged head 7 and embraces the latter like a fork. The beveled detent faces 41 may exert a stressing or tightening action on the head 7.

If it is believed that said self-tightening joint is not sufficiently safe, a screwdriver can be used to turn the abutment pin 18 to the right so that the projecting cam 32 is rotated forwardly in the non-rising semicircular groove 24 and the projection 33 engages and locks the lower leg of the detent lever 19 in the manner shown in FIG. 2.

To open the connecting fixture, the abutment pin 18 can be turned by means of a screwdriver to the left through about one revolution so that the pin 18 is moved across the joint 24, 25 into the rising guide groove 25 to an end position, which is apparent in FIG. 3 and in which the compression spring 20 is relaxed to such a degree that the joint can be eliminated by the application of a slight vertical opposing pressure between elements 1 and 4 without a need for special implements.

FIGS. 9 to 12 show a second embodiment of the connecting fixture, which the first fixture element 50 also comprises a cuplike receiving housing 51, which is provided with a hooklike projection 52, which in its bottom portion is formed with a bracketlike backing surface 53. The second fixture element 54 has an entrance opening for the hooklike portion 52 in like manner to the first embodiment. That entrance opening receives the hooklike leg 55 of the detent lever 56. The interlocked portions of the hooklike portions 52 and of the detent lever 56 are curved or crowned so that they can interengage with a self-tightening action.

Figure 9:
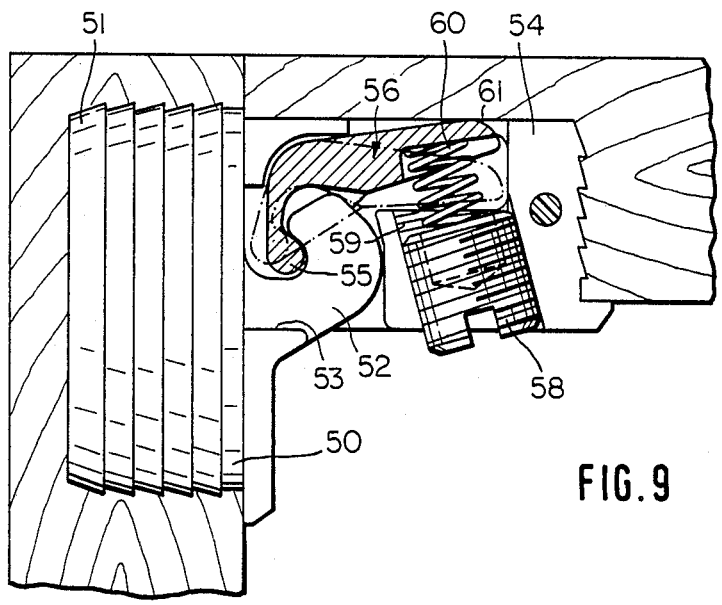
FIG. 9 is a longitudinal sectional view showing a second embodiment of a connecting fixture having connecting fixtures which have been connected to furniture elements, which are shown in an assembled condition.
Figure 10:
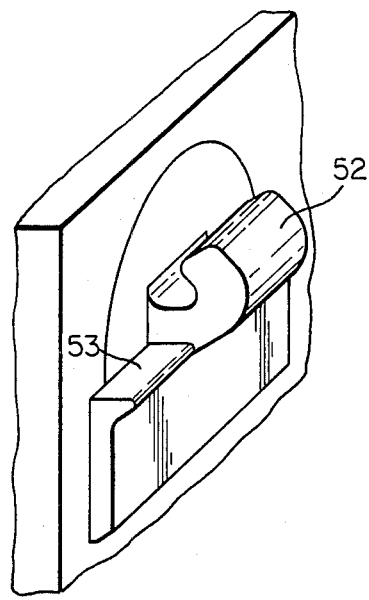
FIG. 10 is a perspective view showing the first fixture element of the connecting fixture of FIG. 9 after the fixation of said element to a furniture element.
Figure 11:
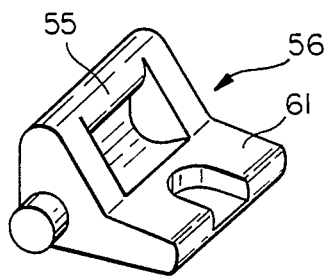
FIG. 11 is a perspective view showing the detent lever of the second fixture element of the connecting fixture of FIG. 9.

In the embodiment shown in FIGS. 9 to 11 the abutment pin 58 is provided with screw threads, which are screwed into mating internal screw threads of the bore or opening 59 so that the compression spring 60 can be stressed in dependence on the depth to which the abutment pin 58 is screwed in.

The abutment pin 58 can be screwed into the housing of the second fixture element 54 to such a depth that the pin bears on and locks the inner leg 61 of the detent lever 56 in the manner previously described in relation to the first embodiment.

In other respects, the connecting fixture shown in FIGS. 9 to 11 is designed like the connecting fixture shown in FIGS. 1 to 8.

What is claimed:

1. A connecting fixture for detachably connecting two abutting platelike furniture parts, which fixture comprises two fixture elements, a first of said fixture elements having an undercut-defining portion and a second of the fixture element adapted to be interlocked with the first element by a hook-shaped end portion of a pivoted, spring-biased detent lever on the second element engaging said undercut portion; wherein the second element includes a movable abutment portion and a spring held under stress between the abutment portion and the detent lever, the spring biasing the detent lever toward a locking position with respect to the undercut portion and the abutment portion being movable between a first position and a second position, the abutment portion in the first position engaging and positively locking the detent lever in said locking position and the abutment portion in said second position disengaging the detent lever and allowing pivotal movement of the detent lever against the biasing force of the spring.

2. A connecting fixture according to claim 1, characterized in that the abutment portion consists of a cylindrical abutment pin, which is held in a cylindrical bore of the second fixture element and which is provided with radial projections extending into recess means in the surface that defines the bore so that the abutment pin can be held in different positions, which are spaced apart in the axial direction of the bore.

3. A connecting fixture according to claim 2 wherein the recess means comprises a guide groove in a peripheral wall of the cylindrical bore.

4. A connecting fixture according to claim 3, characterized in that the guide groove extends approximately throughout the periphery of the surface defining the bore.

5. A connecting fixture according to claim 3, characterized in that the guide groove consists of a non-rising peripheral portion and an adjoining rising peripheral portion.

6. A connecting fixture according to claim 3, characterized in that a cam is provided at the inner end of the abutment pin.

7. A connecting fixture according to claim 1, characterized in that the housing of the second fixture element consists of two parts which define a parting line extending through the axial center plane of the second fixture element, the two housing parts define portions of the guide groove, one portion of the guide groove extends at right angles to the center line of the bore, another portion of the groove extends at an acute angle to said center line and the guide groove portions register with each other at the parting line.

8. A connecting fixture according to claim 1, characterized in that the abutment pin has an axial projection which bears on the detent lever when the pin has been inserted and properly rotated.

9. A connecting fixture according to claim 8, characterized in that the abutment pin is rotatable to move the projection to a position in which it is disengaged from the detent lever.

10. A connecting fixture according to claim 8, characterized in that the abutment pin has external screw threads and the bore has mating internal screw threads.

11. A connecting fixture according to claim 8, characterized in that the detent lever consists of a bell-crank lever.

12. A connecting fixture according to claim 11, characterized in that one leg of the bell-crank lever is biased by the spring and the other leg is provided with the hooklike projection.

13. A connecting fixture according to claim 1, characterized in that the outside surface of the hooklike projection is beveled in the direction in which the undercut-defining portion is inserted.

14. A connecting fixture according to claim 1, characterized in that the inner surface of the hooklike projection is formed with a beveled or rounded detent surface.

15. A connecting fixture according to claim 1, characterized in that the first fixture element consists of a pin, which has a mushroomlike head at the end and a screw fitting at the other end, the second fixture element has an opening, in which that leg of the detent lever which is provided with the hooklike portion is disposed, and the abutment pin is adapted to be slidably inserted in its radial direction into said opening.

16. A connecting fixture according to claim 1, characterized in that the first fixture element consists of a cuplike mounting part that is provided with a hooklike portion and the hooklike portion of the detent lever has a shape that is complementary to and interlocks with the hooklike portion of the mounting part.

17. A connecting fixture according to claim 1, characterized in that the axis of the bore for receiving the abutment pin is inclined from the center line of the cuplike second fixture element.

* * * * *